(12) United States Patent
Rutkowski et al.

(10) Patent No.: US 10,931,796 B2
(45) Date of Patent: *Feb. 23, 2021

(54) DIFFUSING PACKETS TO IDENTIFY FAULTY NETWORK APPARATUSES IN MULTIPATH INTER-DATA CENTER NETWORKS

(71) Applicant: Microsoft Technology Licensing, LLC, Redmond, WA (US)

(72) Inventors: Bradley David Rutkowski, Woodinville, WA (US); Srinivasachakrapani Kotipalli, Sammamish, WA (US); Mathrubootham Janakiraman, Redmond, WA (US); Veenu Singla, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 3 days.

This patent is subject to a terminal disclaimer.

(21) Appl. No.: 16/417,623

(22) Filed: May 20, 2019

(65) Prior Publication Data

US 2019/0273810 A1    Sep. 5, 2019

Related U.S. Application Data

(63) Continuation of application No. 15/424,439, filed on Feb. 3, 2017, now Pat. No. 10,320,954.

(51) Int. Cl.
*H04L 29/06* (2006.01)
*H04L 12/26* (2006.01)
(Continued)

(52) U.S. Cl.
CPC ........ *H04L 69/161* (2013.01); *H04L 41/0677* (2013.01); *H04L 43/0829* (2013.01);
(Continued)

(58) Field of Classification Search
CPC ... H04L 69/161; H04L 69/14; H04L 43/0829; H04L 45/24; H04L 41/0677
See application file for complete search history.

(56) References Cited

U.S. PATENT DOCUMENTS

| | | | |
|---|---|---|---|
| 5,488,608 A * | 1/1996 | Flammer, III | H04L 45/00 370/400 |
| 8,005,989 B2 * | 8/2011 | Corl, Jr. | H04L 69/22 709/240 |

(Continued)

*Primary Examiner* — Rasheed Gidado

(57) ABSTRACT

The techniques described herein describe diffusing packets through multipath inter-data center networks to identify faulty network apparatuses therein. In an implementation, a method of diffusing packets through a multipath inter-data center network to identify a faulty network apparatus in a source data center is disclosed. The method includes diffusing packets through various paths of a network fabric. Diffusing the packets includes sending out bursts of packets with varying packet header parameters to a set of machines in one or more target data centers. The method further include monitoring packet drops from the bursts of packets, issuing tracerts for each of the packet drops to identify corresponding failed routes, and triangulating the failed routes to identify the faulty network apparatus.

20 Claims, 12 Drawing Sheets

(51) Int. Cl.
*H04L 12/24* (2006.01)
*H04L 12/707* (2013.01)
*H04L 12/743* (2013.01)

(52) U.S. Cl.
CPC .............. *H04L 45/24* (2013.01); *H04L 69/14* (2013.01); *H04L 45/7453* (2013.01)

(56) References Cited

U.S. PATENT DOCUMENTS

| | | | | |
|---|---|---|---|---|
| 8,457,000 | B2 * | 6/2013 | West | H04M 3/2227 370/242 |
| 8,661,295 | B1 * | 2/2014 | Khanna | H04L 41/065 714/43 |
| 8,724,479 | B1 * | 5/2014 | Aybay | H04L 49/555 370/242 |
| 9,055,000 | B1 * | 6/2015 | Ghosh | H04L 45/74 |
| 9,225,650 | B2 * | 12/2015 | Ogata | H04L 47/12 |
| 9,479,427 | B2 * | 10/2016 | Venkataswami | H04L 45/125 |
| 2005/0100035 | A1 * | 5/2005 | Chiou | H04L 45/24 370/412 |
| 2007/0283042 | A1 * | 12/2007 | West | H04L 65/80 709/238 |
| 2011/0051727 | A1 * | 3/2011 | Cai | H04L 12/1877 370/390 |
| 2015/0124629 | A1 * | 5/2015 | Pani | H04L 61/2007 370/248 |

* cited by examiner

800A

Source Machine (M1_1) – T0_1 Source Rack - T1_1 Source Router – T2 Source Router – T3_1 Source Router – Core Router CS_1 Source – Core Router Target CT_1 – T3_1 Target Router – T2_1 Target Router – T1_1 Target Router – T0_1 Target Rack – Target Machine (M2_1)

Source Machine (M1_2) – T0_2 Source Rack - T1_2 Source Router – T2 Source Router – T3_2 Source Router – Core Router CS_2 Source – Core Router Target CT_2 – T3_2 Target Router – T2_1 Target Router – T1_2 Target Router – T01_2 Target Rack – Target Machine (M2_2)

FIGURE 8A

| Device | #Repeated |
|---|---|
| T2 Source Router | 2 |
| M1_1 | 1 |
| M1_2 | 1 |
| T0_1 Source | 1 |
| T0_2 Source | 1 |
| T1_1 Source | 1 |
| T1_2 Source | 1 |
| T3 Source | 1 |
| T3 Source | 1 |
| Core Router CS_1 Source | 1 |
| Core Router CS_2 Source | 1 |
| Core Router CT_1 Target | 1 |
| Core Router CT_2 Target | 1 |
| T3_1 Target | 1 |
| T3_2 Target | 1 |
| T2_1 Target | 1 |
| T2_2 Target | 1 |
| T1_1 Target | 1 |
| T1_2 Target | 1 |
| T0_1 Target | 1 |
| T0_2 Target | 1 |
| M2_1 | 1 |
| M2_2 | 1 |

FIGURE 8B

| Source Machine (M1_1) – T0_1 Source Rack – T1_1 Source Router – T2 Source Router – T3 Source Router – Core Router CS_1 Source – Core Router Target CT_1 – T3_1 Target Router – T2_1 Target Router – T1_1 Target Router – T0_1 Target Rack – Target Machine (M2_1) |
|---|
| Source Machine (M1_2) – T0_2 Source Rack – T1_2 Source Router – T2 Source Router – T3 Source Router – Core Router CS_2 Source – Core Router Target CT_2 – T3_2 Target Router – T2_1 Target Router – T1_2 Target Router – T01_2 Target Rack – Target Machine (M2_2) |

| Source neighbor device | Target neighbor device | #Repeated |
|---|---|---|
| T2 Source | T3 Source | 2 |
| M1_1 | T0_1 Source | 1 |
| M1_2 | T0_2 Source | 1 |
| T0_1 Source | T1_1 Source | 1 |
| T0_2 Source | T1_2 Source | 1 |
| T1_1 Source | T2 Source | 1 |
| T1_2 Source | T2 Source | 1 |
| T3 Source | Core Router CS_1 Source | 1 |
| T3 Source | Core Router CS_2 Source | 1 |
| Core Router CS_1 Source | Core Router CT_1Target | 1 |
| Core Router CS_2 Source | Core Router CT_2Target | 1 |
| Core Router CT_1 Target | T3_1 Target | 1 |
| Core Router CT_2 Target | T3_2 Target | 1 |
| T3_1 Target | T2_1 Target | 1 |
| T3_2 Target | T2_2 Target | 1 |
| T2_1 Target | T1_1 Target | 1 |
| T2_2 Target | T1_2 Target | 1 |
| T1_1 Target | T0_1 Target | 1 |
| T1_2 Target | T0_2 Target | 1 |
| T0_1 Target | Target Machine M2_1 | 1 |
| T0_2 Target | Target Machine M2_2 | 1 |

FIGURE 9B

DIFFUSING PACKETS TO IDENTIFY FAULTY NETWORK APPARATUSES IN MULTIPATH INTER-DATA CENTER NETWORKS

CROSS-REFERENCE TO RELATED APPLICATIONS

This application is a continuation of, and claims priority to, U.S. Non-Provisional patent application Ser. No. 15/424,439 filed Feb. 3, 2017, titled "DIFFUSING PACKETS TO IDENTIFY FAULTY NETWORK APPARATUSES IN MULTIPATH INTER-DATA CENTER NETWORKS," which is incorporated herein by reference in its entirety for all purposes.

BACKGROUND

Network health is the key for application availability. Typically, network health is maintained with appropriate investment in infrastructure, e.g., capacity, scalability, redundancy and performance. In a healthy, well-prepared network, hardware can fail without warning and traffic can be routed through redundant paths. For example, in a typical data center, a router hierarchy (or fabric) consists of a multi-level or multi-layer set of hundreds or thousands of routers that work in conjunction to provide higher availability and redundancy.

Simple Network Management Protocol (SNMP) and other monitors and device traps along with Border Gateway Protocol (BGP) can identify when a network device completely fails, i.e., a black failure. Typically, black failures are easily mitigated without significant impact to the underlying applications. However, additional complexity arises when a network device is dropping some, but not all, packets, i.e., gray failures. Network device traps on SNMP often cannot detect these packet drops, a phenomenon referred to as silent packet drops. For example, if a router is dropping packets, neighbor routers (in the hierarchy) are not aware of the drops and continue to send traffic to the faulty router. In transmission control protocol (TCP), the routers resend packets that are dropped to mitigate loss with multiple retries before requests are eventually dropped. This results in unnecessary latency and inefficiency.

Unfortunately, because the network device traps on SNMP and other known monitors cannot detect the packet drops, and because there are a large number of possible paths in a typical hierarchy, faults can take on the order of tens of hours to detect and localize.

Overall, the examples herein of some prior or related systems and their associated limitations are intended to be illustrative and not exclusive. Upon reading the following, other limitations of existing or prior systems will become apparent to those of skill in the art.

OVERVIEW

Examples discussed herein relate to diffusing packets through multipath inter-data center networks to identify faulty network apparatuses contained therein. In an implementation, a method of diffusing packets through a multipath inter-data center network to identify a faulty network apparatus in a source data center is disclosed. The method includes diffusing packets through various paths of a network fabric. Diffusing the packets includes sending out bursts of packets with varying packet header parameters to a set of machines in one or more target data centers. The method further include monitoring packet drops from the bursts of packets, issuing tracerts for each of the packet drops to identify corresponding failed routes, and triangulating the failed routes to identify the faulty network apparatus.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

FIGS. 8A and 8B illustrate example tracerts (failed paths) and a table illustrating network apparatuses of the tracerts sorted based on the number of times each apparatus occurs in the failed paths, respectively.

FIGS. 9A and 9B illustrates example tracerts (failed paths) and a table illustrating sets of neighbor devices of the tracerts sorted based on the number of times each set of neighbor apparatuses occurs, respectively.

DETAILED DESCRIPTION

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a computing device, or a computer readable medium.

Techniques are described for identifying faulty apparatuses (or gray failures) within a multipath inter-data center network by diffusing network packets through various paths of the multipath network fabric. As discussed above, network device traps on SNMP and other known monitors cannot adequately detect faulty apparatuses such as network devices, interfaces, links, etc., that are dropping packets. A packet diffuser tool is described herein that is configured to send bursts of TCP packets with varying packet header parameters to reach available targets in different data centers. For example, the packet diffuser tool can first identify or determine a list of available source and destination ports and then send, or direct the machine running the tool to send one or more packets for each source port-destination port combination.

The network apparatuses within the multipath network fabric, e.g., routers and other equipment, route the packets using a hash calculated from the packet header parameters. Accordingly, when the packet diffuser tool varies the parameters for each of the packets, the routers route the packet through different paths of the multipath network fabric. The packet diffuser tool monitors dropped packets and issues tracerts for each packet drop to identify a corresponding failed route (or path). The packet diffuser consolidates the failed routes and triangulates the consolidated group of failed routes to identify the faulty network apparatus.

In some embodiments, the packet diffuser tool is run on multiple random machines across multiple random racks of the data center to target a different set of machines in different data centers. Consequently, at least one technical effect enabled by the packet diffuser tool and the techniques discussed herein is the ability to reach all possible paths (routes) in a multipath data center and thus speed up fault detection and localization.

Figure 1:
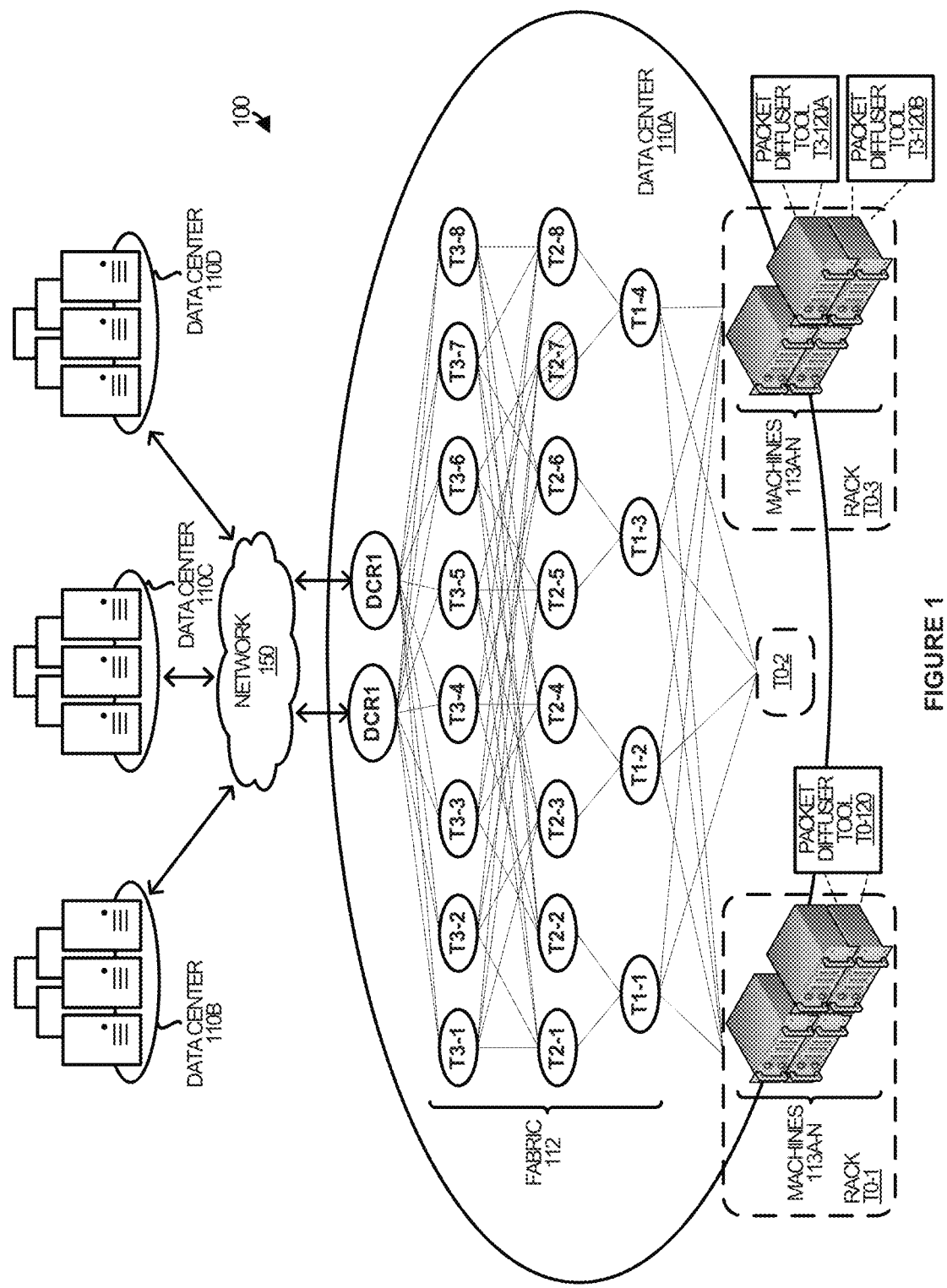
FIG. 1 depicts a block diagram illustrating an example multipath inter-data center network architecture through which multiple instances of a diffuser tool can diffuse packets to identify faulty network apparatuses, according to some embodiments.

FIG. 1 depicts a block diagram illustrating an example multipath inter-data center network architecture 100 through which multiple instances of a diffuser tool can diffuse packets to identify faulty network apparatuses, according to some embodiments. As shown in the example of FIG. 1, the multipath inter-data center network architecture 100 includes data centers 110A-110D and a network 150. An exploded view of data center 110A is shown. Data centers 110B-110D can have similar components and architectures, although alternative configurations are also possible.

Data center 110A includes Data Center Relocation (DCR) apparatuses DCR1 and DCR2, fabric 112, and racks T0-1, T0-2, and T0-3. DRC1 and DCR2 are configured to facilitate communication between data center 110A and data centers 110B-110D over network 150. Fabric 112 consists of a multi-level or multi-layer set of routers that work in conjunction to provide higher availability and redundancy. As shown in the example of FIG. 1, fabric 112 consists of three layers of routers T1, T2, and T3. The layers are shown with four or eight routers; however, it is appreciated that alternative configurations can include layers with any number of routers such that the fabric includes hundreds or thousands of routers that work in conjunction to provide higher availability and redundancy.

Each rack T0-1, T0-2 and T0-3 can include a set of machines 113A-N, e.g., server computers, blade servers, rack servers, or any other type of computing system (or collection thereof) suitable for executing applications or services hosted on data center 110A and/or otherwise carrying out the operations discussed herein. In some embodiments, each machine in the rack can include an instance of a packet diffuser tool. Alternatively, the packet diffuser tool can be installed on random machines within random racks.

As shown in the example of FIG. 1, a first instance of the packet diffuser tool T0-120 is run on a first machine in rack T0-1 and second and third instances of the packet diffuser tool T3-120A and T3-120B are run on different machines in rack T0-3. As discussed herein, the diffuser tool (or an instance thereof) can be installed on many or all of the machines in many or all of the racks. Alternatively, the tool may be installed on select random machines in random racks. In either case, in operation, the packet diffuser tool is run on a random set of machines in a random set of racks to target machines in random set of data centers. The randomization maximizes the probability of diffusing the packets over a route that includes the faulty network apparatus. As discussed herein, the faulty network apparatus can be a faulty router or a faulty network link or interface within fabric 112.

In operation, each packet diffuser tool T0-120, T3-120A and T3-120B runs on an individual machine, e.g., at leaf-level of the data center network topology, in data center 110A. In some embodiments, a network administrator or other indicator indicates that a faulty network apparatus is located within the data center network topology, and each packet diffuser tool is directed to send bursts of packets to reachable target machines in other data centers, e.g., 110B-110D, over various paths by varying packet header parameters. For example, the packet diffuser tool can send out bursts of TCP packets with varying source port, destination port to reach out to target machines (not shown) in different data centers, e.g., data centers 110B-110D. In some embodiments, the packet diffuser tools send multiple packets for each source port—destination port combination from a list (or manifest) of available machines.

Each TCP packet header can contain a source port, a destination port, a source IP address, and a destination IP address. The routers in fabric 112 route the packets using a hash calculated from these header parameters. When packet diffuser tool varies these header parameters, the packets are routed to different neighbors and, thus, traverse different routes through the fabric 112. Accordingly, the TCP packets sent from the multiple packet diffuser tools T0-120, T3-120A and T3-120B have the potential reach all possible paths (routes) in the data center.

The diffuser tools monitor for packet drops. For example, when no acknowledge message (or 'ack') is received for a packet within a specified period of time, then the packet is considered lost or dropped. In some embodiments, the packet diffuser tools monitor for lost packets and track the ports used for the lost or dropped packets. If a packet is determined to be dropped or lost, then the diffuser tool can issue a tracert, e.g., ICMP packets for each of the hop in the path, to extract the route the lost packet took across the internet protocol (IP) network and other log information (e.g., transit delays, etc.). An example tracert result is shown and discussed in further detail with reference to FIG. 7. The packet diffuser tool then uses the tracert results to identify the failed routes corresponding to the packet drops and consolidates the failed routes from one or more of the packet diffuser tools. At least one packet diffuser tool then triangulates the failed routes to identify the faulty network apparatus. In this manner, the packet diffuser tools T0-120, T3-120A and T3-120B work in conjunction to identify the faulty network apparatuses.

Figure 2:
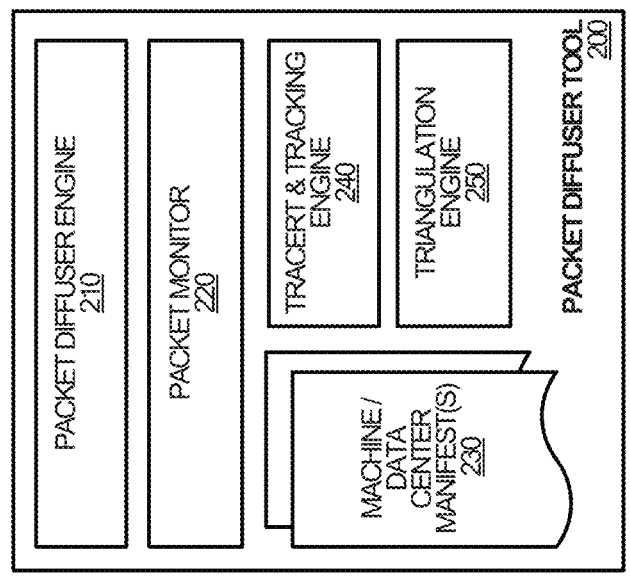
FIG. 2 depicts example components of a packet diffuser tool, according to some embodiments.

FIG. 2 depicts example components of a packet diffuser tool 200, according to some embodiments. The packet diffuser tool 200 is representative of packet diffuser tools T0-120, T3-120A and T3-120B of FIG. 1, although alternative configurations are possible. The functions represented by the components, modules and/or engines described with reference to FIG. 2 can be implemented individually or in any combination thereof, partially or wholly, in hardware, software, or a combination of hardware and software.

As illustrated in the example of FIG. 2, packet diffuser tool 200 includes a packet diffuser engine 210, a packet monitor 220, one or more machine/data center manifests 230, a tracert and tracking engine 240, and a triangulation engine 250.

The packet diffuser engine 210 is configured to identify a set of target machines in one or more target data centers of an inter-data center network. The set of target machines can be persisted in the one or more machine/data center manifests 230. The packet diffuser engine 210 then generates packets with varying packet header parameters, and send packets in bursts for delivery to the set of target machines. As discussed herein, varying the packet header parameters results in the packets taking different paths through the multipath fabric of a source data center.

The packet monitor 220 is configured to monitor the packet drops of the bursts of packets sent to the to the set of target machines. In some embodiments, packet drops are detected when an acknowledgement indicating safe receipt of a packet is not received within a predetermined period.

The tracert and tracking engine 240 is configured to issue tracerts for each of the packet drops and process the tracerts to identify corresponding failed routes. In some embodiments, the tracert and tracking engine 240 also consolidates the failed routes across multiple packet diffuser tools running on one or more machines of one or more racks. As discussed herein, each tracert can indicates a route from a source machine in a source data center through network apparatuses of the network fabric to a target machine in a target data center. Additionally, each tracert can further indicate IP addresses and port information used by the route.

The triangulation engine 250 is configured to triangulate the failed routes to identify a faulty network apparatus in a source data center. In some embodiments, the faulty network apparatus can comprise a faulty router. In such instances, triangulating the failed paths to identify the faulty network apparatus can include computing a number of times each network apparatus occurs in the failed routes, and identifying the faulty network apparatus as the network apparatus occurring the highest number of times in the failed routes.

Alternatively, the faulty network apparatus can comprise a faulty network link or interface. In such instances, triangulating the failed paths to identify the faulty network apparatus can include computing a number of times each set of neighbor devices occurs in the failed routes, wherein each set of the neighbor devices includes a first device and a second device, identifying a set of the neighbor devices occurring the highest number of times in the failed routes; and identifying the faulty network apparatus as an apparatus connecting the set of the neighbor devices.

Figure 3:
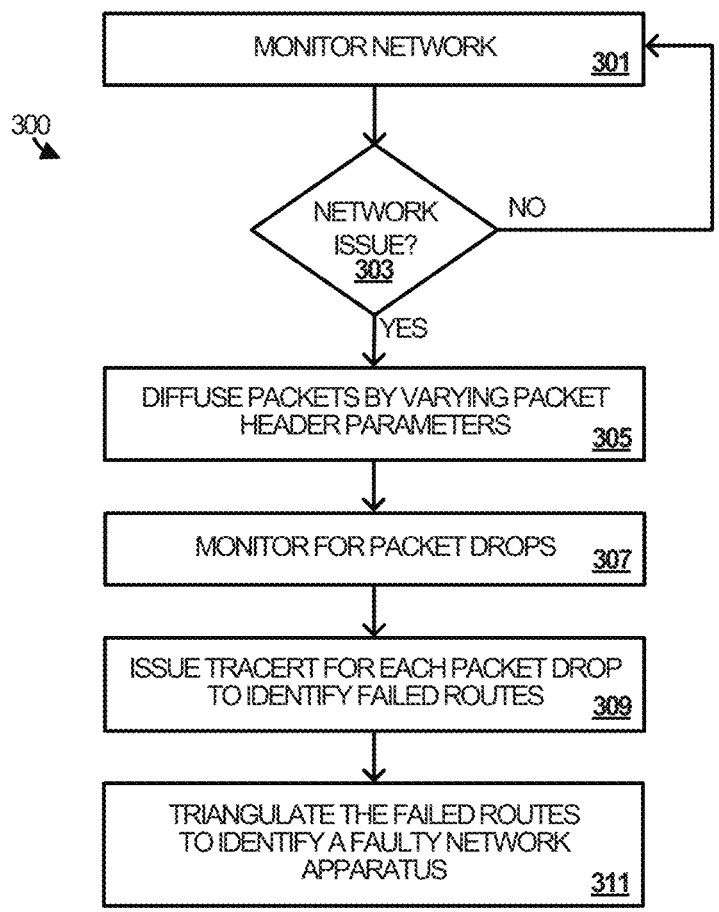
FIG. 3 depicts a flow diagram illustrating example operations for diffusing network packets to identify a faulty apparatus in a multipath inter-data center network, according to some embodiments.

FIG. 3 depicts a flow diagram illustrating example operations 300 for diffusing network packets to identify a faulty apparatus in a multipath inter-data center network, according to some embodiments. The example operations 300 may be performed in various embodiments by a packet diffuser tool such as, for example, packet diffuser tool 200 of FIG. 2, or one or more processors, extensions, modules, engines, components or tools associated therewith.

To begin, at 301, the packet diffuser tool monitors for potential network issues that are indicative of gray failures. For example, the system might track packet transmission latencies, user complaints, etc., to identify potential network issues. Alternatively, a system administrator can manually notify the system regarding a potential network issue.

At decision 303, the packet diffuser tool determines whether there is an issue and whether to commence the packet diffusion process. If so, at step 305, the packet diffuser tool diffuses the packets through various paths of a source data center network fabric. As discussed herein, diffusing the packets can include generating and sending out bursts of packets with varying packet header paraments to a set of machines in one or more target data centers.

At step 307, the packet diffuser tool monitors packet drops from the bursts of packets. At step 309, the packet diffuser tool issues tracerts for each of the packet of the packet drops to identify corresponding failed routes. For example, the packet diffuser tool collects all tracerts from the packet drops to identify failed routes and consolidates them into the list of routes that are dropping packets.

Lastly, at step 311, the packet diffuser tool triangulates the failed routes to identify the faulty network apparatus. Examples of the triangulation process are shown and discussed in greater detail with reference to FIGS. 5 and 6.

Figure 4:
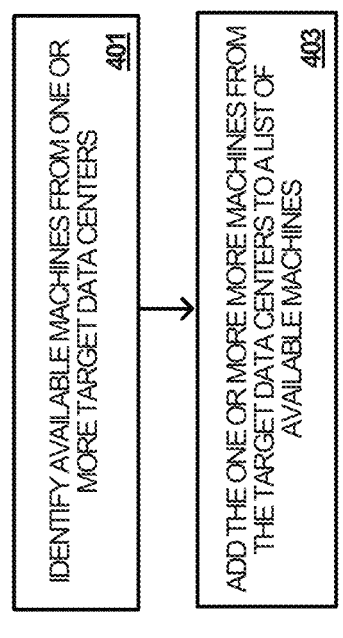
FIG. 4 depicts a flow diagram illustrating example operations for identifying a list of available target machines in different data centers, according to some embodiments.

FIG. 4 depicts a flow diagram illustrating example operations 400 for identifying a list of available target machines in different data centers, according to some embodiments. The example operations 400 may be performed in various embodiments by a packet diffuser tool such as, for example, packet diffuser tool 200 of FIG. 2, or one or more processors, extensions, modules, engines, components or tools associated therewith.

To begin, at 401, the packet diffuser tool identifies available target machines (not shown) in different data centers, e.g., data centers 110B-110D of FIG. 1. The diffuser tool may include listings of associated data machines, etc., or may gather this information periodically, receive information from system administrators, or otherwise obtain this information. As discussed herein, the target machines are considered available if the set of ports are opened through firewalls on both ends, and no other limitations to block the ports are placed on intermediate fabric/core routers, etc. At 403, the packet diffuser tool adds the identified available target machines to a list (or manifest) containing the available machines.

Figure 5:
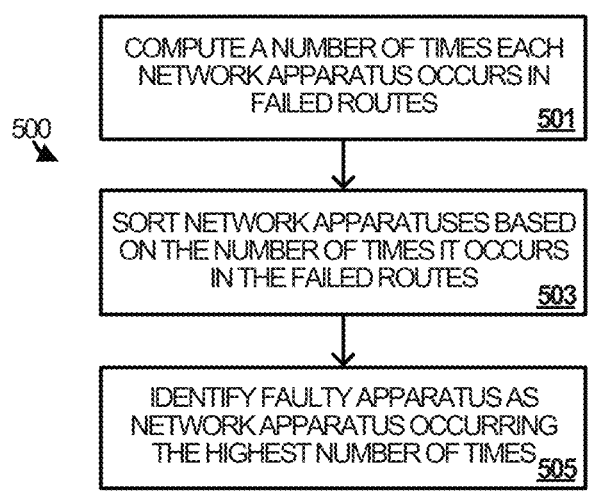
FIG. 5 depicts a flow diagram illustrating example operations for triangulating failed paths to identify faulty network apparatuses, according to some embodiments.

FIG. 5 depicts a flow diagram illustrating example operations 500 for triangulating failed paths to identify faulty network apparatuses, according to some embodiments. More specifically, example operations 500 depict identifying a faulty network device or router. The example operations 500 may be performed in various embodiments by a packet diffuser tool such as, for example, packet diffuser tool 200 of FIG. 2, or one or more processors, extensions, modules, engines, components or tools associated therewith.

To begin, at 501, the packet diffuser tool processes the tracert results to compute a number of times each network apparatus occurs in the failed routes. For example, the tracerts from failed routes are processed to compute the number of times each router is listed in the failed routes. It is appreciated that the same network apparatus (or router) is not expected to be listed more than once in the same tracert. FIG. 8A illustrates two example (failed paths) tracerts for purposes of illustration. As shown, each hop along the path from the source machine to the destination machine is shown.

At 503, the packet diffuser tool sorts the network apparatuses based on the number of times the apparatus occurs in the failed route. For example, FIG. 8B illustrates an example of the network apparatuses of the two tracerts shown in FIG. 8A sorted based on the number of times each apparatus occurs. As shown, 'T2 Source Router' appears twice. Lastly, at 505, the packet diffuser tool identifies the faulty apparatus as 'T2 Source Router' and remediation actions can be taken to remove or replace the router from the fabric.

Figure 6:
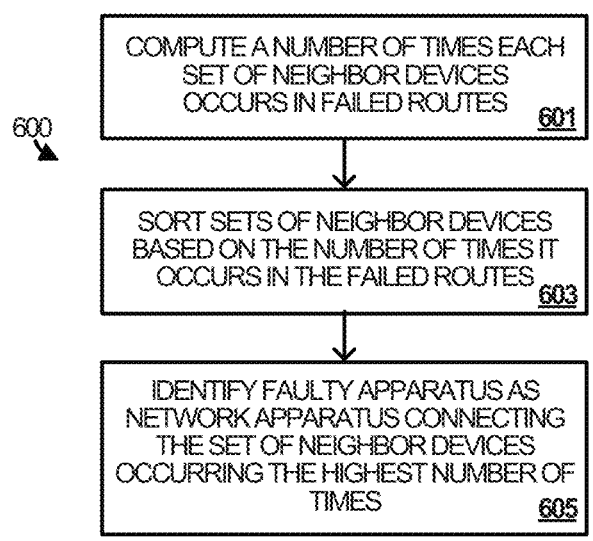
FIG. 6 depicts a flow diagram illustrating example operations for triangulating failed paths to identify faulty network apparatuses, according to some embodiments.

FIG. 6 depicts a flow diagram illustrating example operations 600 for triangulating failed paths to identify faulty network apparatuses, according to some embodiments. More specifically, example operations 600 depict identifying a faulty network link or interface. The example operations 600 may be performed in various embodiments by a packet diffuser tool such as, for example, packet diffuser tool 200 of FIG. 2, or one or more processors, extensions, modules, engines, components or tools associated therewith.

To begin, at 601, the packet diffuser tool computes a number of times each set of neighbor of devices occurs in the failed routes. For example, the tracerts from failed routes are processed to compute the number of times each set of neighbor routers is listed in the failed routes. FIG. 9A illustrates two example (failed paths) tracerts for purposes of illustration. As shown, each hop along the path from the source machine to the destination machine is shown.

At 603, the packet diffuser tool sorts the sets of neighbor devices based on the number of times the sets of neighbor apparatuses occur in the failed route. For example, FIG. 9B illustrates an example of the sets of neighbor devices of the two tracerts shown in FIG. 9A sorted based on the number of times each set of neighbor apparatuses occurs. As shown, the set of neighbor devices 'T2 Source Router—T3 Source Router' appears twice. Lastly, at 605, the packet diffuser tool identifies the faulty apparatus as an interface or link connecting 'T2 Source Router' and 'T3 Source Router.' Once identified, remediation actions can be taken to remove or replace the faulty interface or link from the fabric.

Figure 7:
FIG. 7 depicts example tracert results, according to some embodiments.

FIG. 7 depicts example tracert results, according to some embodiments. The tracert provides an indication of the set hops (at each fabric layer/DCR) from the source data center to the target data center including IP addresses at both ends and port information. The tracert command is a Command Prompt command that is used to show several details about the path that a packet takes from the source computer or device to the destination computer or device.

Figure 10:
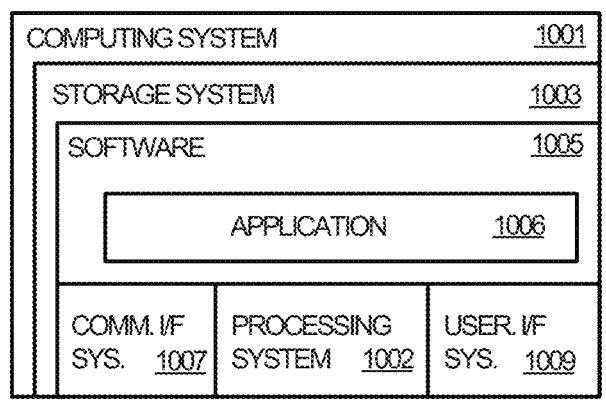
FIG. 10 is a block diagram illustrating a computing system suitable for implementing the electronic calendar sharing technology disclosed herein, including any of the applications, architectures, elements, processes, and operational scenarios and sequences illustrated in the Figures and discussed below in the Technical Disclosure.

FIG. 10 illustrates computing system 1001, which is representative of any system or collection of systems in which the various applications, services, scenarios, and processes disclosed herein may be implemented. For example, computing system 1001 may include server computers, blade servers, rack servers, and any other type of computing system (or collection thereof) suitable for carrying out the enhanced collaboration operations described herein. Such systems may employ one or more virtual machines, containers, or any other type of virtual computing resource in the context of supporting enhanced group collaboration.

Computing system 1001 may be implemented as a single apparatus, system, or device or may be implemented in a distributed manner as multiple apparatuses, systems, or devices. Computing system 1001 includes, but is not limited to, processing system 1002, storage system 1003, software 1005, communication interface system 1007, and user interface system 1009. Processing system 1002 is operatively coupled with storage system 1003, communication interface system 1007, and an optional user interface system 1009.

Processing system 1002 loads and executes software 1005 from storage system 1003. When executed by processing system 1002 for deployment of scope-based certificates in multi-tenant cloud-based content and collaboration environments, software 1005 directs processing system 1002 to operate as described herein for at least the various processes, operational scenarios, and sequences discussed in the foregoing implementations. Computing system 1001 may optionally include additional devices, features, or functionality not discussed for purposes of brevity.

Referring still to FIG. 10, processing system 1002 may comprise a micro-processor and other circuitry that retrieves and executes software 1005 from storage system 1003. Processing system 1002 may be implemented within a single processing device, but may also be distributed across multiple processing devices or sub-systems that cooperate in executing program instructions. Examples of processing system 1002 include general purpose central processing units, application specific processors, and logic devices, as well as any other type of processing device, combinations, or variations thereof.

Storage system 1003 may comprise any computer readable storage media readable by processing system 1002 and capable of storing software 1005. Storage system 1003 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1003 may also include computer readable communication media over which at least some of software 1005 may be communicated internally or externally. Storage system 1003 may be implemented as a single storage device, but may also be implemented across multiple storage devices or sub-systems co-located or distributed relative to each other. Storage system 1003 may comprise additional elements, such as a controller, capable of communicating with processing system 1002 or possibly other systems.

Software 1005 may be implemented in program instructions and among other functions may, when executed by processing system 1002, direct processing system 1002 to operate as described with respect to the various operational scenarios, sequences, and processes illustrated herein. For example, software 1005 may include program instructions for directing the system to perform the processes as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1005 may include additional processes, programs, or components, such as operating system software, virtual machine software, or application software. Software 1005 may also comprise firmware or some other form of machine-readable processing instructions executable by processing system 1002.

In general, software 1005 may, when loaded into processing system 1002 and executed, transform a suitable apparatus, system, or device (of which computing system 1001 is representative) overall from a general-purpose computing system into a special-purpose computing system. Indeed, encoding software on storage system 1003 may transform the physical structure of storage system 1003. The specific transformation of the physical structure may depend on various factors in different implementations of this description. Examples of such factors may include, but are not limited to, the technology used to implement the storage media of storage system 1003 and whether the computer-storage media are characterized as primary or secondary storage, as well as other factors.

For example, if the computer readable storage media are implemented as semiconductor-based memory, software 1005 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1007 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 1009 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 1009. In some cases, the input and output devices may be combined in a single device, such as a display capable of displaying images and receiving touch gestures. The aforementioned user input and output devices are well known in the art and need not be discussed at length here. In some cases, the user interface system 1009 may be omitted when the computing system 1001 is implemented as one or more server computers such as, for example, blade servers, rack servers, or any other type of computing server system (or collection thereof).

User interface system 1009 may also include associated user interface software executable by processing system 1002 in support of the various user input and output devices discussed above. Separately or in conjunction with each other and other hardware and software elements, the user interface software and user interface devices may support a graphical user interface, a natural user interface, or any other type of user interface, in which a user interface to a productivity application may be presented.

Communication between computing system 1001 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. In any of the aforementioned examples in which data, content, or any other type of information is exchanged, the exchange of information may occur in accordance with any of a variety of well-known data transfer protocols.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of diffusing packets through a multipath inter-data center network to identify a faulty network apparatus in a source data center, the method comprising:
   diffusing, with a plurality of source machines within the source data center, the packets through various paths of a network fabric of the source data center in response to an indication of a device failure in the network fabric of the source data center,
      wherein diffusing the packets comprises sending out bursts of packets with varying packet header parameters from the plurality of source machines to a set of destination machines in one or more target data centers, each of the target data centers having a respective network fabric;
   monitoring, using each of the plurality of source machines, packet drops from the bursts of packets sent from the respective source machine;
   issuing tracerts, from the respective source machine, for each of the packet drops;

identifying, with each of the source machines, failed routes based on the tracerts issued by the respective source machine;

consolidating, by a first machine of the plurality of source machines, the failed routes identified by each of the plurality of source machines; and triangulating, by the first machine, the failed routes to identify the faulty network apparatus, wherein the triangulating comprises:

computing a number of times each set of neighbor devices occurs in the failed routes, wherein each set of the neighbor devices includes a first device and a second device, identifying a set of the neighbor devices occurring the highest number of times in the failed routes, and identifying the faulty network apparatus as an apparatus connecting the set of the neighbor devices.

2. The method of claim 1, wherein the packets comprise transmission control protocol (TCP) packets.

3. The method of claim 1, wherein the packet header parameters comprise a source port and a destination port, and wherein diffusing the packets comprises bursting multiple packets for each available source port/destination port combination.

4. The method of claim 2, wherein the packet header parameters comprise a source port, a destination port, a source IP address, and a destination IP address, and wherein diffusing the TCP packets comprises bursting multiple TCP packets for each available source port/destination port source IP address/destination IP address combination.

5. The method of claim 1, wherein each tracert indicates a route from a source machine in the source data center through network apparatuses of the network fabric to a target machine in a target data center.

6. The method of claim 4, wherein each tracert further indicates IP addresses and port information.

7. The method of claim 1, wherein packet drops are detected when an acknowledgement indicating safe receipt of a packet is not received within a predetermined period of time.

8. The method of claim 1, wherein the plurality of source machines comprise at least one machine from each of a plurality of racks in the source data center.

9. The method of claim 1, wherein faulty network apparatus comprises a faulty router.

10. The method of claim 1, wherein the plurality of source machines comprise randomly selected machines in randomly selected racks of the source data center.

11. The method of claim 1, wherein the faulty network apparatus comprises a network link or interface.

12. The method of claim 1, wherein diffusing the packets further comprises:

identifying available machines in the one or more target data centers; and adding the available machines to a list containing the set of available machines.

13. A source data center comprising:

a multipath network fabric including a multi-layer set of redundant routers;

multiple racks each comprising multiple source machines, wherein at least a subset of the source machines are configured to:

diffuse packets through various paths of the multipath network fabric to collectively identify a faulty network apparatus in response to an indication of a device failure in the multipath network fabric of the source data center, wherein diffusing the packets comprises sending out bursts of packets with varying packet header parameters from the subset of the machines to a set of destination machines in one or more target data centers, each of the target data centers having a respective network fabric, monitor, using each of the subset of the source machines, packet drops from the bursts of packets sent from the respective source machine, issue tracerts, from the respective source machine, for each packet drop from the bursts of packets, and identify, with each of the source machines, failed routes based on the tracerts issued by the respective source machine, and wherein a first source machine of the subset of the source machines is configured to:

consolidate the failed routes identified by each of the subset of the source machines, and triangulate the consolidated failed routes to identify the faulty network apparatus, wherein the triangulating comprises:

computing a number of times each set of neighbor devices occurs in the failed routes, wherein each set of the neighbor devices includes a first device and a second device, identifying a set of the neighbor devices occurring the highest number of times in the failed routes, and identifying the faulty network apparatus as an apparatus connecting the set of the neighbor devices.

14. The data center of claim 13, wherein packet drops are detected when an acknowledgement indicating safe receipt of a packet is not received within a predetermined period of time.

15. The data center of claim 13, wherein the packet header parameters comprise a source port and a destination port, and wherein diffusing the packets comprises bursting multiple packets for each available source port/destination port combination.

16. The data center of claim 13, wherein the faulty network apparatus comprises a failed router of the set of redundant routers.

17. The data center of claim 13, wherein the faulty network apparatus comprises a failed network link or interface.

18. An apparatus comprising:

one or more computer readable storage media; and program instructions stored on the one or more computer readable storage media which, when executed by a processing system, direct the processing system to at least:

diffuse packets through various paths of a multipath inter-data center network fabric, wherein to diffuse the packets, the processing system sends out bursts of packets with varying packet header parameters to a set of machines in one or more target data centers;

monitor packet drops from the bursts of packets;

issue tracerts for each of the packet drops to identify corresponding failed routes;

consolidate the corresponding failed routes with failed routes identified by a plurality of source machines to generate a plurality of failed routes; and triangulate the failed routes to identify a faulty network apparatus in a source data center, wherein the triangulating comprises:

computing a number of times each set of neighbor devices occurs in the plurality of failed routes, wherein each set of the neighbor devices includes a first device and a second device, identifying a set of the neighbor devices occurring the highest number of times in the plurality of failed routes, and identifying the faulty network apparatus as an apparatus connecting the set of the neighbor devices.

19. The apparatus of claim 18, wherein the packets comprise transmission control protocol (TCP) packets.

20. The apparatus of claim 18, wherein the packet header parameters comprise a source port and a destination port, and wherein diffusing the packets comprises bursting multiple packets for each available source port/destination port combination.

* * * * *